United States Patent
Yamasaki

(10) Patent No.: US 7,412,112 B2
(45) Date of Patent: Aug. 12, 2008

(54) IMAGE GENERATION APPARATUS, IMAGE GENERATION SYSTEM AND IMAGE SYNTHESIS METHOD

(75) Inventor: Masami Yamasaki, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 612 days.

(21) Appl. No.: 11/086,677

(22) Filed: Mar. 23, 2005

(65) Prior Publication Data
US 2005/0220361 A1    Oct. 6, 2005

(30) Foreign Application Priority Data
Mar. 30, 2004    (JP) ............... 2004-097560

(51) Int. Cl.
G06K 9/36 (2006.01)
G06K 9/32 (2006.01)
G09G 5/00 (2006.01)
H04N 9/47 (2006.01)

(52) U.S. Cl. ............... 382/284; 382/294; 345/626; 345/629; 348/149; 701/208

(58) Field of Classification Search ............... 382/284, 382/294; 345/629
See application file for complete search history.

(56) References Cited

U.S. PATENT DOCUMENTS

| 6,512,857 B1 * | 1/2003 | Hsu et al. ............... 382/294 |
| 6,725,154 B2 * | 4/2004 | Kamikawa et al. ......... 701/208 |
| 6,989,842 B2 * | 1/2006 | Cropper et al. ............ 345/629 |
| 7,088,365 B2 * | 8/2006 | Hashizume ................ 345/428 |
| 2003/0085992 A1 * | 5/2003 | Arpa et al. ................. 348/47 |
| 2004/0119819 A1 * | 6/2004 | Aggarwal et al. .......... 348/143 |

FOREIGN PATENT DOCUMENTS

| JP | 06-284330 | 10/1994 |
| JP | 2001-319218 | 11/2001 |
| JP | 2002-077889 | 3/2002 |
| JP | 2002-344929 | 11/2002 |
| JP | 2003-134503 | 5/2003 |

* cited by examiner

Primary Examiner—Matthew Bella
Assistant Examiner—Jose M Torres
(74) Attorney, Agent, or Firm—McDermott Will & Emery LLP

(57) ABSTRACT

A surveillance system includes an image deformation unit for deforming the image captured or picked up by a surveillance camera so that the appearance of a specified region within this image has the same geometric shape as that of its corresponding region on the map, and an image synthesis display unit operable to extract the specific region of the deformed image and synthesize it in the corresponding map region for on-screen visualization, obtaining the mutual relationship of a plurality of images.

14 Claims, 13 Drawing Sheets

FIG.20

| MONITOR CAMERA #N | |
|---|---|
| PROJECTION CONVERSION COEFFICIENT | CONSTANT VALUE |
| a0 | |
| b0 | |
| c0 | |
| a1 | |

| MONITOR CAMERA #N | |
|---|---|
| PROJECTION CONVERSION COEFFICIENT | CONSTANT VALUE |
| a0 | |

2003

| MONITOR CAMERA #N | |
|---|---|
| PROJECTION CONVERSION COEFFICIENT | CONSTANT VALUE |
| a0 | |
| b0 | |
| c0 | |
| a1 | |
| b1 | |
| c1 | |
| a2 | |
| b2 | |
| c2 | |

2002

2001

IMAGE GENERATION APPARATUS, IMAGE GENERATION SYSTEM AND IMAGE SYNTHESIS METHOD

INCORPORATION BY REFERENCE

The present application claims priority from Japanese application JP2004-097560 filed on Mar. 30, 2004, the content of which is hereby incorporated by reference into this application.

BACKGROUND OF THE INVENTION

This invention relates to an apparatus, system and method for combining together images taken by camera devices placed at a plurality of locations to generate for display a synthesized or composite image. More particularly, the invention relates to a surveillance camera system and a surveillance camera image display method.

A surveillance work by means of a surveillance system using monitor cameras generally includes performing image acquisition by use of at least one or more surveillance cameras capable of capturing a portion or the entirety of an area under surveillance, and also includes displaying the captured scene images on a video image display device such as a cathode ray tube (CRT) that is installed at a remote location where a security officer or "surveillant" is present by simultaneously displaying multiple monitor camera-captured images at divided screen portions or alternatively by sequentially displaying the monitor camera images so that a selected one of them is displayed at a time while switching it to another, to thereby recognize and judge the occurrence of a critical event such as an unusual situation happened within the surveillance area. In such the surveillance work through observation of the monitor camera images, the human being who is a surveillant uses three kinds of information items—i.e., i) the imaging condition as to the surveillance area of interest that is being captured or "photographed" from which camera position at what view angle for which range of the area, ii) the captured image information per se, and iii) known information concerning the monitor camera' installation location—to make a comprehensive judgment for understanding and recognizing the event that presently happens in the surveillance area.

To do this, known surveillance systems are typically designed to employ a method for displaying on a video display device the three kinds of information—namely, the surveillance camera's imaging conditions, captured images, and known information as to the surveillance locations—while dividing the display screen into portions for respective visualization or a method for representing the information on a surveillance area as a map and for diagrammatically showing on the map the imaging conditions by use of symbols while letting the video image of a selected camera be displayed in a separate window (for example, see JP-A-6-284330, JP-A-2003-134503, JP-A-2002-77889, and JP-A-2002-344929).

In addition, there is known a technique for use in a surveillance system for airports, rivers, harbors or the like with relatively less obstructions within a range under surveillance. This technique uses a plurality of cameras with different picture angles to provide multiple captured scene images of a wide surveillance area, for reconstructing such images into a single image being viewed from a certain point and then synthesizing the entire surveillance area into a map being looked at from its overhead direction (see JP-A-2001-319218).

With the above-noted related arts, each is designed to display a camera-captured scene image in its native or "raw" form. For this reason, even when indicating with the aid of symbols the imaging conditions such as the imaging direction of a surveillance camera on a map indicative of the surveillance range, the surveillant is still required to carry out a series of recognition processes because of the lack of the matching or consistency in geometric relationship between the captured images and the map, which processes may include attempting to imagine or "re-image" the map-indicated surveillance range into a visual appearance of the monitor range in the case of looking at from the same view point as the monitor camera, comparing such the image to the actually captured surveillance image, and then recognizing an event that presently occurs within the surveillance range. Thus the surveillant is compelled to keep high concentration power constantly. This would cause problems, such as a risk that he or she is likely to commit judgment mistakes.

In addition, in cases where an increased number of obstructions such as public buildings or else are present in the surveillance range, the inconsistency or mismatch in geometric relationship between the surveillance camera-captured image and the map information can sometimes take place in a way depending upon the conversion processing to be performed during visual reconstruction into a single image.

Additionally, in the case of such mismatch of the geometric relationship between images captured by a plurality of cameras from different positions, the above-identified Japanese patent documents fail to provide any feasible solutions thereto.

SUMMARY OF THE INVENTION

It is an object of the present invention to provide a method for synthesizing and displaying within a map the acquired images of a plurality of surveillance cameras in an easy-to-see way. Another object of the invention is to provide a surveillance system that enables implementation of the display method.

To attain at least one of the foregoing objects, a surveillance system of this invention is arranged to include more than one surveillance scene imaging unit, a transfer unit for sending forth an image acquired by the imager unit toward a surveillance center, an image receive/storage unit for receiving the image sent by the transfer unit and for storing therein the received image, an image deformation unit for deforming the image so that the visual appearance of a specific region within the image is the same in geometric shape as its corresponding region of a map, a partial image extraction unit for extracting a specific region of the deformed image in accordance with mask information that designates the specific region, and an image synthesis and display unit for synthesizing the partial extracted image of the deformed image into its corresponding region of the map and for displaying it.

The system is such that respective scene images, which are acquired or captured by several imaging units being different from each other in imaging direction and imaging position plus imaging view angle, are each deformed by the image deformation unit in such a way that the visual appearance of a specific region within the image of interest is matched with the same geometric shape as its corresponding region within the map whereas the partial image extraction unit extracts a specific region of the deformed image while the image synthesis/display unit synthesizes for display this extracted partial image into its corresponding region within the map. Thus, it is no longer required for operators to perform the reading and understanding of images while taking into consideration the individual imaging unit's image acquisition conditions. Simultaneously, it is also possible to readily recognize and grasp the mutual relationship of imaging ranges of respective images within the map.

According to this invention, it becomes possible to readily obtain the mutual relationship of a plurality of images on the map.

Other objects, features and advantages of the invention will become apparent from the following description of the embodiments of the invention taken in conjunction with the accompanying drawings.

BRIEF DESCRIPTION OF THE DRAWINGS

FIG. 20 is an explanation diagram of a storage form of projection conversion parameters in units of surveillance cameras.

DETAILED DESCRIPTION OF THE EMBODIMENTS

Currently preferred embodiments of the invention will be explained with reference to the accompanying drawings below.

Embodiment 1

Figure 1:
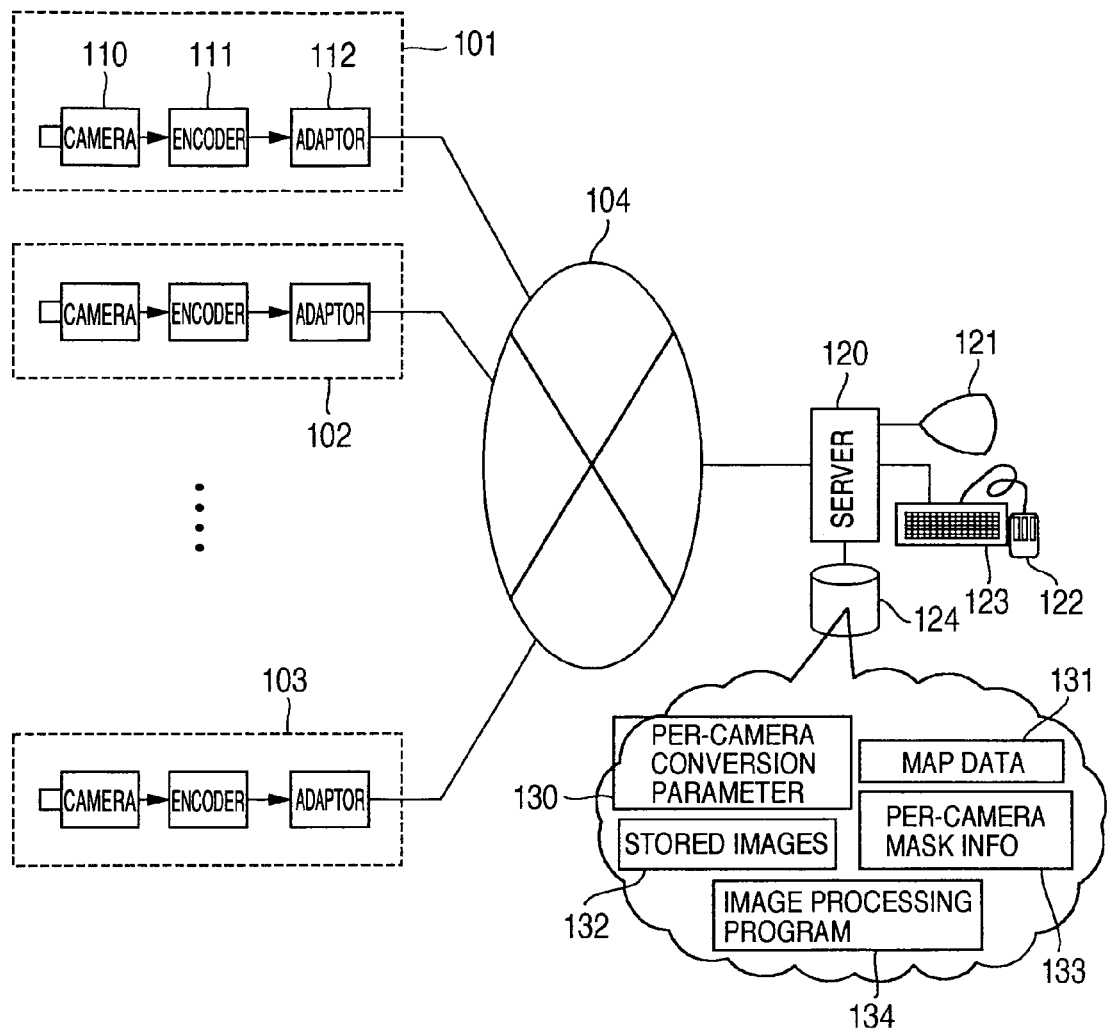
FIG. 1 is a functional block diagram of a surveillance system in accordance with an embodiment of this invention.

Referring to FIG. 1, there is shown a configuration of a surveillance system which collects surveillance camera images via a network, synthesizes them into map data, and visually displays an image thus synthesized. A plurality of network video cameras 101, 102, 103 transmit their acquired images to a video image collecting and browsing server 120 over a network 104. The network camera 101 acquires a scene image by using a camera 110, performs compression encoding of the image data by an image encoder 111, and sends forth the captured or "photographed" image data to the network through a network adapter 112. The video collecting/browsing server 120 is equipped with an external storage device 124 for storing therein several information items such as accumulative surveillance camera image data 132, map data 131 of an area under surveillance, per-camera conversion parameters 130 necessary for the synthesis of a camera-captured image and map data, per-camera mask information 133 for designating the range of a camera-shot image for synthesis to the map data, and an image processing software program 134 of the invention. The server 120 also includes a display unit 121 for visually displaying map information and/or surveillance area images, along with a keyboard 123 and a mouse device 122 for entry of instructions as to a display method and others. Note here that the data being stored in the external storage device 124 may alternatively be held in an internal memory that is built in the video collecting/browsing server 120. In this system, processing is done to collect captured image data, synthesize such collected multiple images into map data, create a new image through the synthesis, and then display it.

Figure 19:
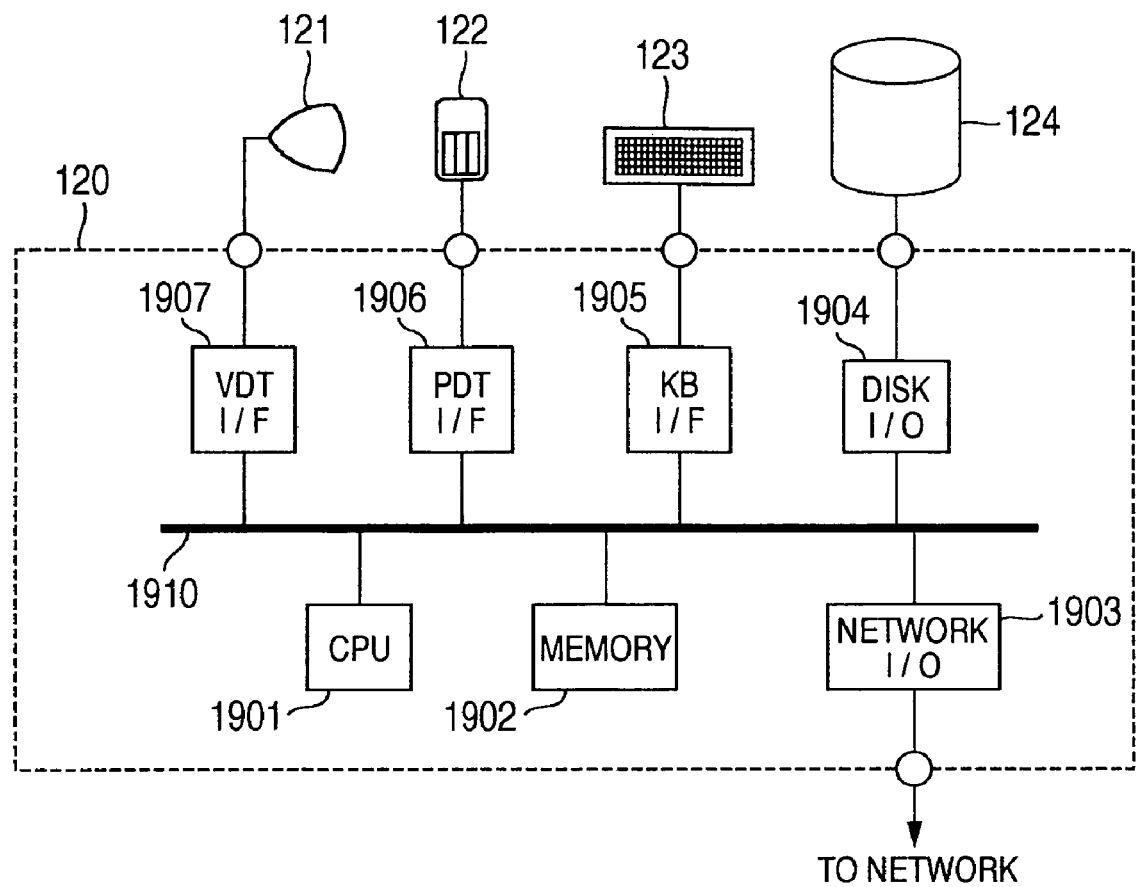
FIG. 19 is an explanation diagram of an internal configuration of a video collecting/browsing server 120.

An internal structure of the video collecting/browsing server 120 will be explained by use of FIG. 19. This video collect/browse server 120 includes a central processing unit (CPU) 1901, a memory 1902, a network interface circuit 1903 connectable to the network for transmitting and receiving data, a disk interface circuit 1904 for sending and receiving data to and from the external storage disk device 124, a keyboard interface circuit 1905 for connecting the keyboard 123, a mouse interface circuit 1906 for connecting the mouse 122, and a video interface circuit 1907 that enables connection of the image display device 121 for displaying an image or images on its screen. These parts or components are interconnected together via a bus 1910.

Figure 2:
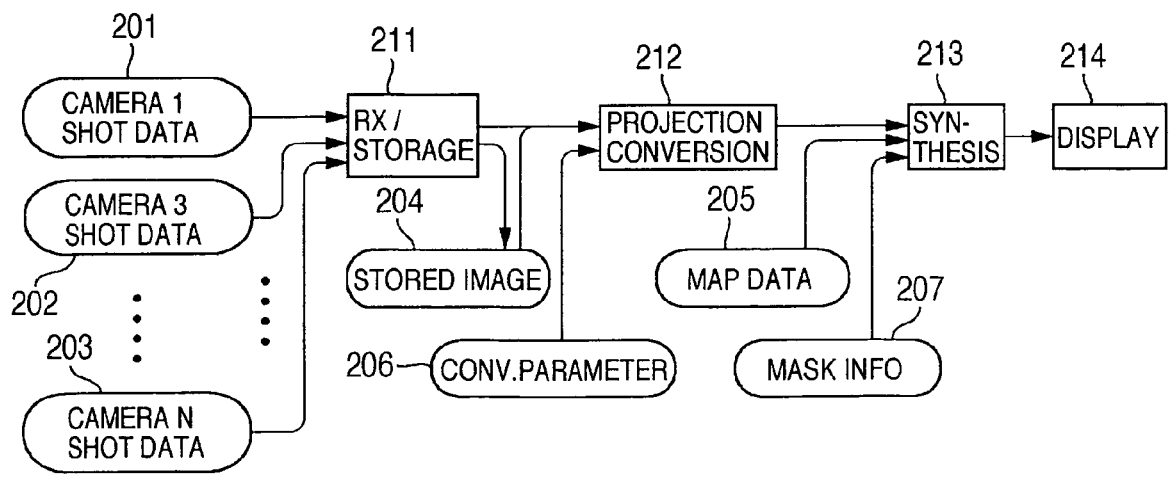
FIG. 2 is a data flow diagram of a surveillance camera image displaying method also embodying the invention.

Next, an explanation will be given of a flow of the image processing procedure of the video collecting/browsing server 120 with respect to surveillance camera-acquired images in this surveillance system, with reference to a data flow diagram of the surveillance image processing shown in FIG. 2. Assume that the data sent via the network to the video collect/browse server 120 are camera 1 imaging data 201, camera 2 imaging data 202, and camera N imaging data 203. These camera imaging data are accumulatively stored in the external storage device 124 by receive/storage processing 211 as stored image data 204 or, alternatively, are utilized on a real time basis as input data of projection conversion processing 212 for the synthesis with a map and for display of a synthesized image. The projection conversion processing 212, whose inputs are stored image data 204 and the parameters 206 of the projection conversion, performs geometric deformation processing for projection conversion of a surveillance camera image to be map-synthesized and displayed on the display device 121, based on a conversion parameter 206 corresponding to the surveillance camera of interest. Regarding the output image data of the projection conversion processing 212, the surveillance camera image is processed by synthesis processing 213 to be buried for synthesis into a map image, while using map data 205 of an area of the surveillance image acquisition and mask information 207 necessary for synthesizing the geometrically deformed surveillance camera image onto the map data. A composite image resulted from the synthesis of the map and the camera image is displayed on the display device 121 by display processing 214. The image processing program 134 of the invention which describes the image processing shown in FIG. 2 is stored in the external storage device 124 connected to the video collect/browse server 120, and loaded upon execution into the video collect/browse server 120 and then executed by a control unit thereof. In short, the video collect/browse server 120 is an apparatus that generates an image(s).

Figure 3:
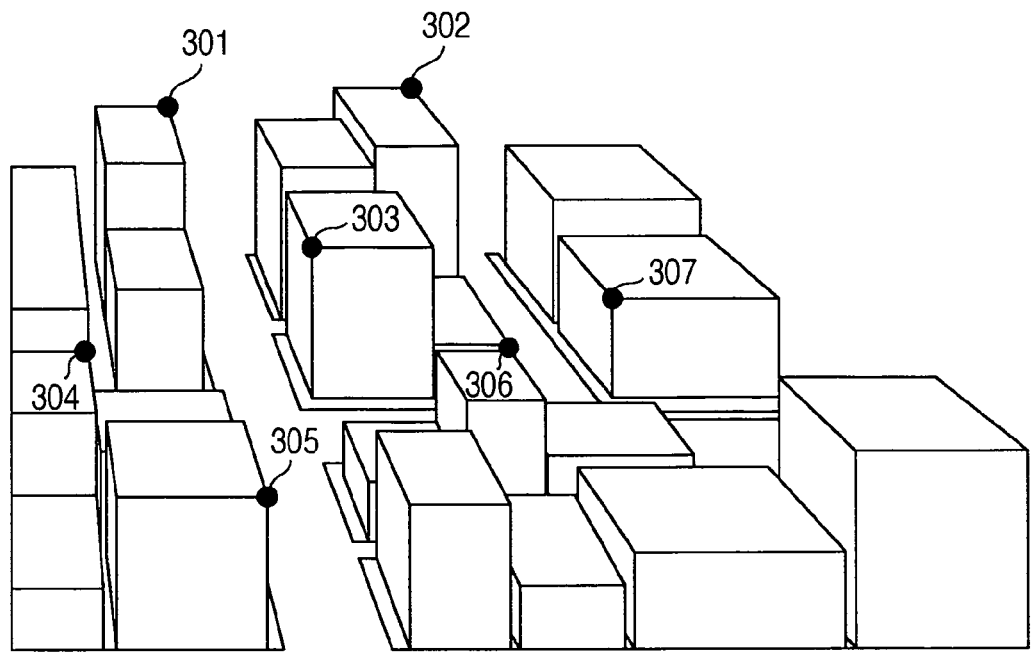
FIG. 3 is a diagram showing an exemplary on-screen image of a bird's eye view of a city block with buildings while indicating therein camera installation locations.
Figure 4:
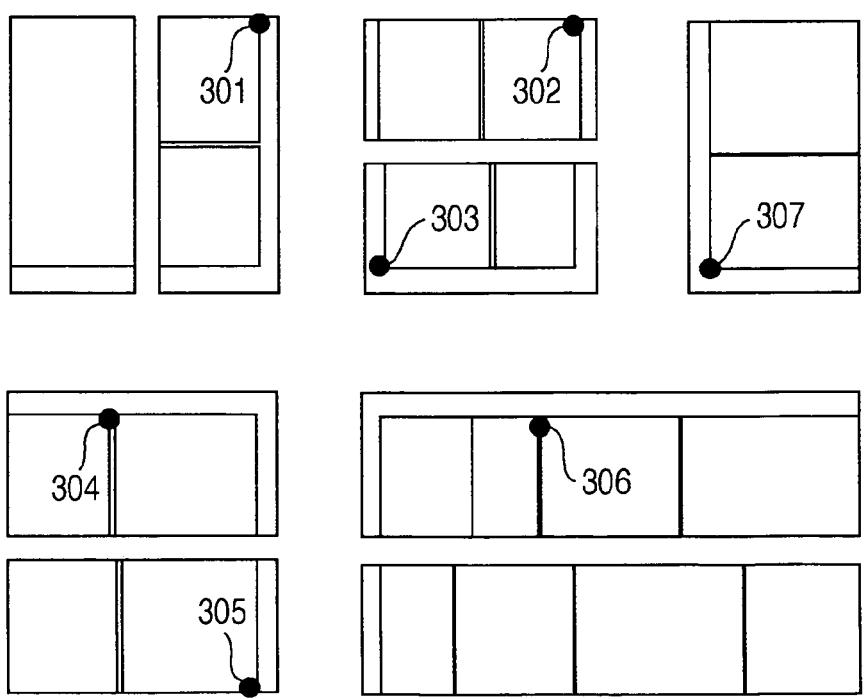
FIG. 4 shows a map image of the same city block with the camera locations added thereto.

Subsequently, in relation to surveillance objects to be monitored by surveillance cameras and surveillance camera installing locations, explanations will be given while using a bird's eye view diagram in FIG. 3 and using a map in FIG. 4. In FIG. 3, a scenery of buildings standing in a city block is depicted in the form of a bird's-eye view. Black circular marks 301 to 307 in this drawing indicate the installation locations of the surveillance cameras that are set at the rooftops of buildings in order to capture or "shoot" scene images on roads around the buildings. In FIG. 4, a pictorial representation is shown by means of a map of the city block shown in FIG. 3.

Figure 5:
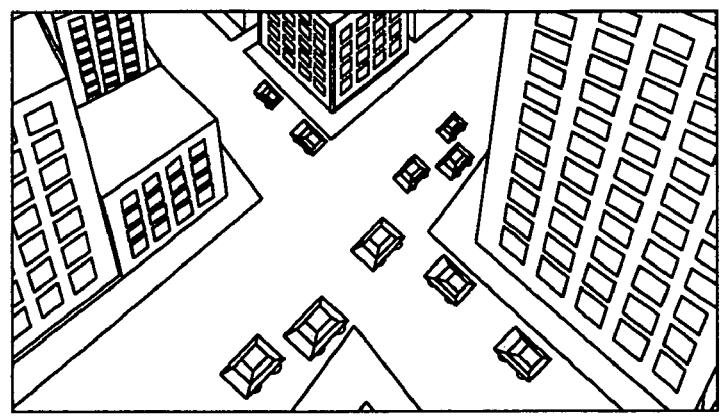
FIG. 5 is an example of a surveillance area image taken from a surveillance camera at an installation location 303.
Figure 7:
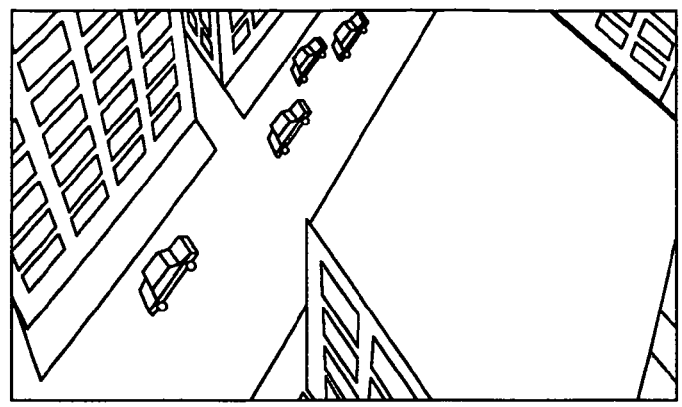
FIG. 7 is an exemplary surveillance area image as taken from a surveillance camera at an installation location 304.

The installation locations of the surveillance cameras shown in FIG. 3 are indicated by black circles with the same numbers as those in FIG. 3 being added thereto. Exemplary surveillance camera-captured scene images of the city block such as shown in FIG. 3 or FIG. 4 are shown in FIG. 5 and FIG. 7. In FIG. 5, there is shown a photo image of roads around buildings, which image was captured by a surveillance camera that is set at the camera installation location 303. Shown in FIG. 7 is a photo image of a street near a building, which was shot by a monitor camera that is placed at another camera installation location 304. As these monitor cameras are different from each other in imaging direction and imaging height and also imaging view angle, it is not easy for a surveillant to find out and understand that each scene image was taken from which building facing which road for which range thereof while visually comparing these images to the city block information shown in FIGS. 3 and 4. In this way, in order to understand from multiple monitor camera images the situation of a surveillance area being captured by the monitor camera of interest, the surveillant is required to do a reading comprehension work that demands concentration power, which task includes the steps of deeply understanding in advance the map information of such surveillance area and differences of each surveillance scene image in imaging location and imaging direction, and then interpreting each surveillance image while conceiving in his or her head which one of respective surveillance images exactly corresponds to which range on the map. Due to this, in order to fulfil a surveillance business task using the monitor cameras, the surveillant who is expected to perform surveillance activities using such monitor cameras is compelled to do works that require high concentration power to complete the reading and comprehension of every monitor image. Consequently, when she/he drops down in concentration power, this often leads to occurrence of a decrease in quality of surveillance works-for example, the lack of an ability to accurately perform the expected image reading and comprehension, or merely viewing the monitor images without aim.

Figure 6:
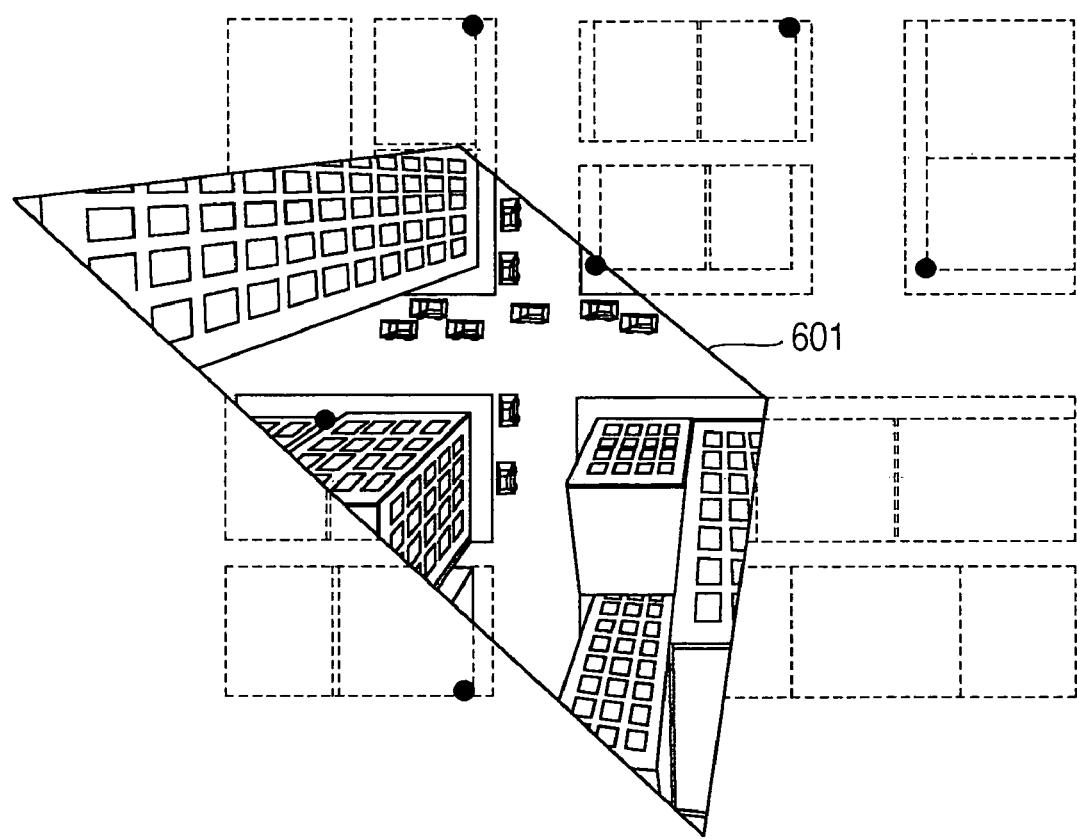
FIG. 6 shows an on-screen image with geometric conversion applied thereto for causing the shape of a road portion of a scene image captured by the surveillance camera at the location 303 to be matched with the shape of its corresponding road part of the map and also shows the converted image's layout on the map.

See FIG. 6, which shows an exemplary on-screen image in which a photo image 601 that is obtained by applying certain projection conversion to the surveillance scene image of FIG. 5 is laid out in such a manner that its road portions coincide with those on the map of FIG. 4. The geometrical conversion for letting the road image portions coincide with corresponding road parts of the map is uniquely determinable from projection conversion that is determined depending upon the installation location and direction of a surveillance camera with respect to the road ground plane and the characteristics of a lens attached to the monitor camera and also geometric conversion that was used for map drawing. Generally, in the map of a range that is narrow enough to neglect the influence of a spherical shape of the surface of Earth, such as the one shown in FIG. 4, the geometric conversion used for map preparation is regarded as parallel projection, which becomes a type of projection conversion. For this reason, the camera monitor image and map's respective road shapes on the earth surface plane become the shapes that are converted from the shapes of real roads or streets by different projection conversion schemes.

Between two geometrical relationship obtained by converting a given planar geometric relationship by two different projection conversion methods, a projection conversion capable of converting one geometric relationship into the other geometric relationship is available. Owing to this nature, as shown in FIG. 6, concerning the geometric relationship on a flat plane such as a road, there must exist a projection conversion which can convert a camera-captured road image into an image enabling it to coincide with a road that is depicted as a map.

Figure 8:
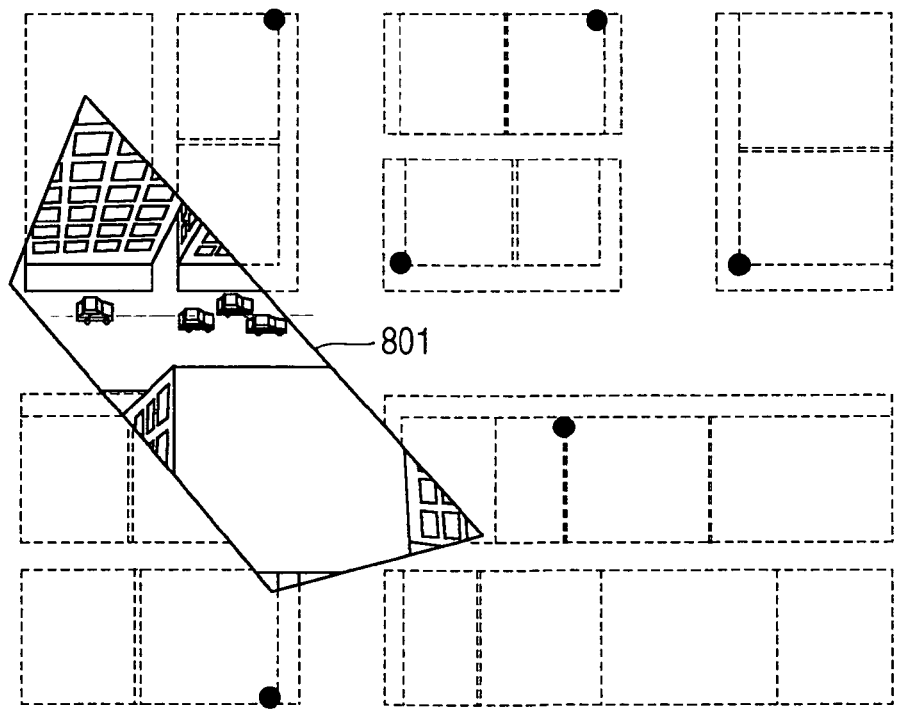
FIG. 8 is an image with geometric conversion applied thereto for causing the shape of a road of an image picked up by the surveillance camera at the location 304 to be identical to the shape of its corresponding road part of the map and also shows its layout on the map.

Similarly, in FIG. 8, there is shown an on-screen image in which a scene image 801 that is obtained by applying a selected kind of projection conversion to the surveillance image of FIG. 7 is disposed on the map of FIG. 4 in such a manner that the geometrical relationships of road portions are matched together. As shown in FIG. 6 or FIG. 8, the scene image which was projection-converted to allow the captured image of a road portion to coincide with a road part on the map is such that only the geometrical relationship on the same plane on which the road exists is matched with the map. Accordingly, those image portions that do not exist on the same plane as the road, such as the building's side faces and rooftop or else, fail to coincide with the geometrical relationship of their corresponding parts as depicted on the map even after the projection conversion.

In the case of two-dimensional (2D) projection conversion for converting the above-noted images, unique determination is usually establishable upon determination of the relationship of four separate points on the planes of a conversion source and a converted one. Thus, the projection conversion for converting so that the captured image of a road portion coincides with a road portion on the map is uniquely determinable by a procedure having the steps of selecting from the road portion on the ground surface plane of a surveillance image any arbitrary four points having the nature that a set of any three points are hardly aligned along a straight line, and then correlating four points on the map to such four points thus selected.

Figure 12:
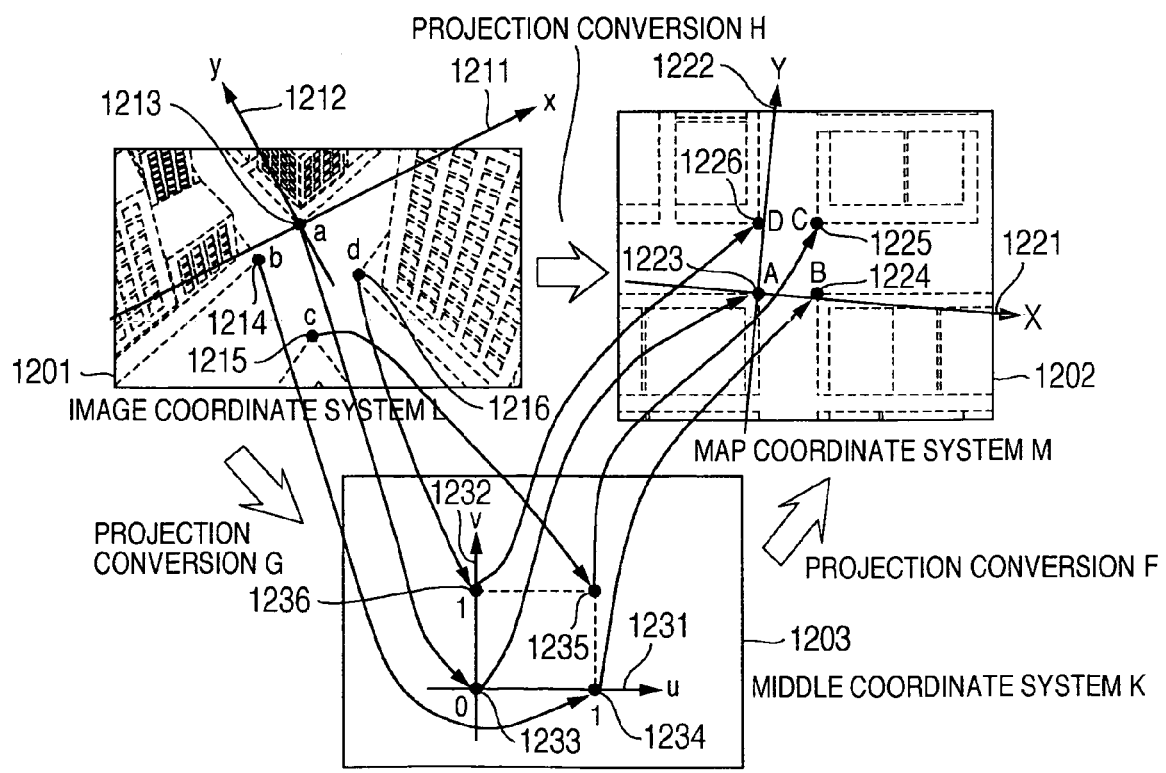
FIG. 12 shows coordinate systems that are set up to the on-the-map road part image and the map respectively in order to define the conversion for matching the road part shapes of the surveillance camera images with the road part image on the map along with an intermediate coordinate system used to calculate an equation for such conversion.

A method for determining such the projection conversion will be explained using FIG. 12. FIG. 12 shows a scene image 1201 which was acquired by a surveillance camera in which an image coordinate system L having an x coordinate axis 1211 and a y coordinate axis 1212 is defined, a map 1202 that is captured by a monitor camera in which an image coordinate system M having its x coordinate axis 1221 and y coordinate axis 1222 is defined, and a 2D plane 1203 in which an image coordinate system K having its u coordinate axis 1231 and v coordinate axis 1232 is defined.

A conversion formula which represents projection conversion H for letting four points a (1213), b (1214), c (1215), d (1216) within the image 1201 correspond to four points A (1223), B (1224), C (1225), D (1226) in the map 1202 becomes an extremely complex conversion equation. In view of this, two projection conversion schemes—i.e., projection conversion G of from the coordinate system L of the image 1201 into the coordinate system K of 2D plane 1203 such as shown in Expression (1), and projection conversion F from the coordinate system K of image 1203 to the coordinate system M of map 1202 shown in Expression (2)—are obtained respectively to thereby obtain a synthesized mapping image H shown in Expression (3). This synthetic mapping image H becomes projection conversion. As shown in Expression (4), it becomes projection conversion H of from the coordinate system L of the image 1201 to the coordinate system M of map 1202.

| Coordinate System L | | Coordinate System K | |
|---|---|---|---|
| G: (x, y) | → | (u, v) | (1) |

| Coordinate System K | | Coordinate System M | |
|---|---|---|---|
| F: (u, v) | → | (X, Y) | (2) |
| H = FoG | | | (3) |

| Coordinate System L | | Coordinate System M | |
|---|---|---|---|
| H: (x, y) | → | (X, Y) | (4) |

As shown in Expression (5), the projection conversion F is defined as projection conversion for causing four points 1233, 1234, 1235 and 1236 having "uv" coordinate values (0,0), (0,1), (1,0) and (1,1) respectively within the 2D plane 1203 to correspond to the four points A (1223), B (1224), C (1225), D (1226) within the map 1202. Here, suppose that the four points A (1223), B (1224), C (1225), D (1226) in the map 1202 have XY coordinate values (0,0), (X2,Y2), (X3,Y3) and (X4,Y4) in the coordinate system M, respectively.

| Coordinate System K | F | Coordinate System M | |
|---|---|---|---|
| (0, 0) | → | Point A (0, 0) | |
| (1, 0) | → | Point B (X2, Y2) | |
| (1, 1) | → | Point C (X3, Y3) | (5) |
| (0, 1) | → | Point D (X4, Y4) | |

Further, as shown in Expression (9), the projection conversion G is defined as projection conversion for letting four points a (1213), b (1214), c (1215), d (1216) within the image 1201 correspond to four points 1233, 1234, 1235, 1236 having uv coordinate values (0,0), (0,1), (1,0) and (1,1) respectively within the 2D plane 1203. Suppose here that the four points a (1213), b (1214), c (1215), d (1216) within the image 1201 have xy coordinate values (0,0), (x2,y2), (x3,y3) and (x4,y4) in the coordinate system L, respectively.

| Coordinate System L | G | Coordinate System K | |
|---|---|---|---|
| Point a (0, 0) | → | (0, 0) | |
| Point b (x2, y2) | → | (1, 0) | |
| Point c (x3, y3) | → | (1, 1) | (9) |
| Point d (x4, y4) | → | (0, 1) | |

A practically implemented equation of the above-defined projection conversion F for conversion from the coordinate value (u,v) of the coordinate system K to the coordinate value (X,Y) of the coordinate system M is shown in Expression (8). Here, coefficients P1, Q1, P2, Q2, P0, Q0, R0 are defined, as indicated on Expression (7), using auxiliary constants T1, T2, T3, T4 that are indicated in Expression (6) as defined by the expression of the coordinate values of the points A (1223), B (1224), C (1225), D (1226).

$$\begin{cases} T4 = X2*Y3 - X3*Y2 \\ T3 = X2*Y4 - X4*Y2 \\ T2 = X3*Y4 - X4*Y3 \\ T1 = T4 + T2 - T3 \end{cases} \quad (6)$$

$$\begin{cases} P1 = T2*X2 \\ Q1 = T4*X4 \\ P2 = T2*Y2 \\ Q2 = T4*Y4 \\ P0 = T2 - T1 \\ Q0 = T4 - T1 \\ R0 = T1 \end{cases} \quad (7)$$

$$\begin{cases} X = \dfrac{P1*u + Q1*v}{P0*u + Q0*v + R0} \\ Y = \dfrac{P2*u + Q2*v}{P0*u + Q0*v + R0} \end{cases} \quad (8)$$

Similarly, a practical expression set of the projection conversion G for converting the coordinate value (x,y) of the coordinate system L to the coordinate value (u,v) of coordinate system K is shown in Expression (12). Here, coefficients p1, q1, p2, q2, p0, q0, r0 are defined, as indicated on Expression (11), using auxiliary constants t1, t2, t3, t4, d1, d2 that are shown in Expression (10) as defined by the equation of the coordinate values of the points a, b, c, d.

$$\begin{cases} t4 = x2*y3 - x3*y2 \\ t3 = x2*y4 - x4*y2 \\ t2 = x3*y4 - x4*y3 \\ t1 = t4 + t2 - t3 \\ d1 = t4 - t3 \\ d2 = t2 - t3 \end{cases} \quad (10)$$

$$\begin{cases} p1 = -t4*t1*y4 \\ q1 = t4*t1*x4 \\ p2 = t2*t1*y2 \\ q2 = -t2*t1*x2 \\ p0 = -d1*t4*y4 + d2*t2*y2 \\ q0 = d1*t4*x4 - d2*t2*x2 \\ r0 = -t4*t3*t2 \end{cases} \quad (11)$$

$$\begin{cases} u = \dfrac{p1*x + q1*y}{p0*x + q0*y + r0} \\ v = \dfrac{p2*x + q2*y}{p0*x + q0*y + r0} \end{cases} \quad (12)$$

Then, the projection conversion H that correspondingly converts the coordinate value (x,y) of the coordinate system L to the coordinate value (X,Y) of the coordinate system M for letting four points a (1213), b (1214), c (1215), d (1216) within the image 1201 correspond to four points A (1223), B (1224), C (1225), D (1226) on the map 1202 can be calculated by first using Expression (12) to obtain a coordinate value (u,v) from the coordinate value (x,y), and then using Expression (8) to get a coordinate value (X,Y) from the coordinate value (u,v). The conversion with two such projection conversions G and F being combined together in this way becomes projection conversion, resulting in the projection conversion H having a form that is representable by nine constant coefficients a0, a1, a2, b0, b1, b2, c0, c1, c2 of Expression (13).

$$\begin{cases} X = \dfrac{a1*x + b1*y + c1}{a0*x + b0*y + c0} \\ Y = \dfrac{a2*x + b2*y + c2}{a0*x + b0*y + c0} \end{cases} \quad (13)$$

The nine constant coefficients included in Expression (13) become practical representation of the per-camera conversion parameters 130 of FIG. 1. In FIG. 20, conversion parameter tables are shown, each of which stores in table form the nine constant coefficients included in Expression (13) in units of surveillance cameras. Tables 2001, 2002 and 2003 are conversion parameter data forms with respect to the monitor cameras 1, 2 and N, respectively.

Upon determination of the above-defined equation between the coordinates for making a road portion of surveillance camera image correspond to a road indication part on the map, it is readily realize the projection conversion processing 212 that is shown in FIG. 2 as an image processing program for deforming image shapes, typically called the geometrical deformation processing, which is executable in the video collecting/browsing server 120 of FIG. 1.

Figure 9:
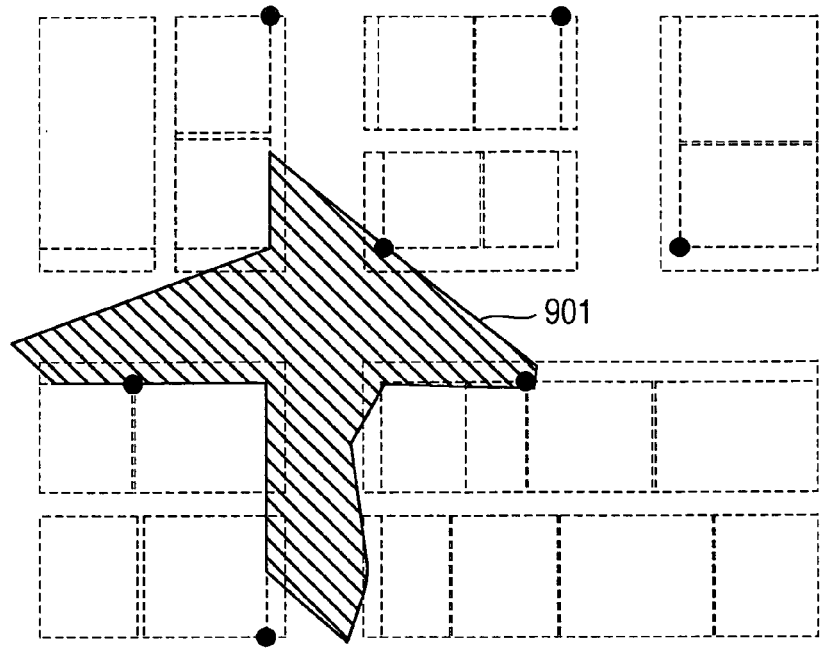
FIG. 9 is a pattern of mask information on the map indicating the imaging range of a road portion that is capturable by the surveillance camera at the location 303.
Figure 10:
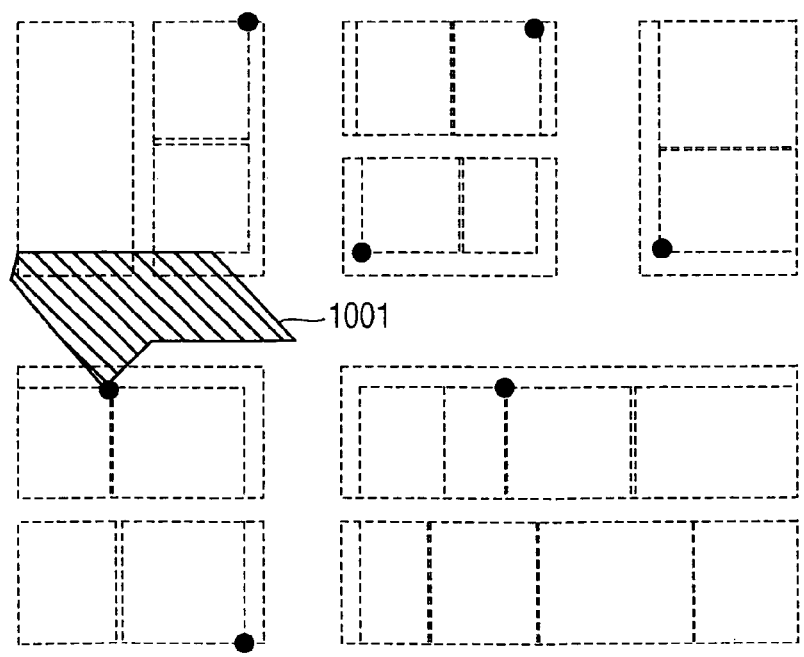
FIG. 10 is a pattern of mask information on the map indicating the imaging range of a road portion that is takable by the surveillance camera at the location 304.

Subsequently, the synthesis processing 213 of FIG. 2 will be explained. This synthesis processing is aimed at using a surveillance camera image that was geometrically deformed by the projection conversion processing 212 to thereby synthesize onto the map of FIG. 4 only road portions of a partial image that is identical in geometric shape to the map. For this purpose, firstly as shown in FIG. 9 and FIG. 10, prepare an image mask, such as 901 or 1001, for each of all the surveillance cameras involved, which mask indicates certain region equivalent to a road portion being acquired by the surveillance camera 303 or 304. Then, let it be the mask information 207 of FIG. 2. If the monitor cameras are fixed in installation position and imaging direction plus imaging picture angle, then the image masks 901 and 1001 are constant. Accordingly, as far as the imaging direction and imaging picture angle are forced to stay constant, the mask information may be once set up and prepared upon installation of such monitor cameras.

The projection-converted images 601 and 801 shown in FIGS. 6 and 8 are processed to extract only the images of certain portions that are designated by the image masks 901 and 1001 shown in FIGS. 9 and 10, respectively. Then, combine them onto the map of FIG. 4. The resultant on-screen display thereof becomes an image portion 1101 shown in FIG. 11.

Figure 13:
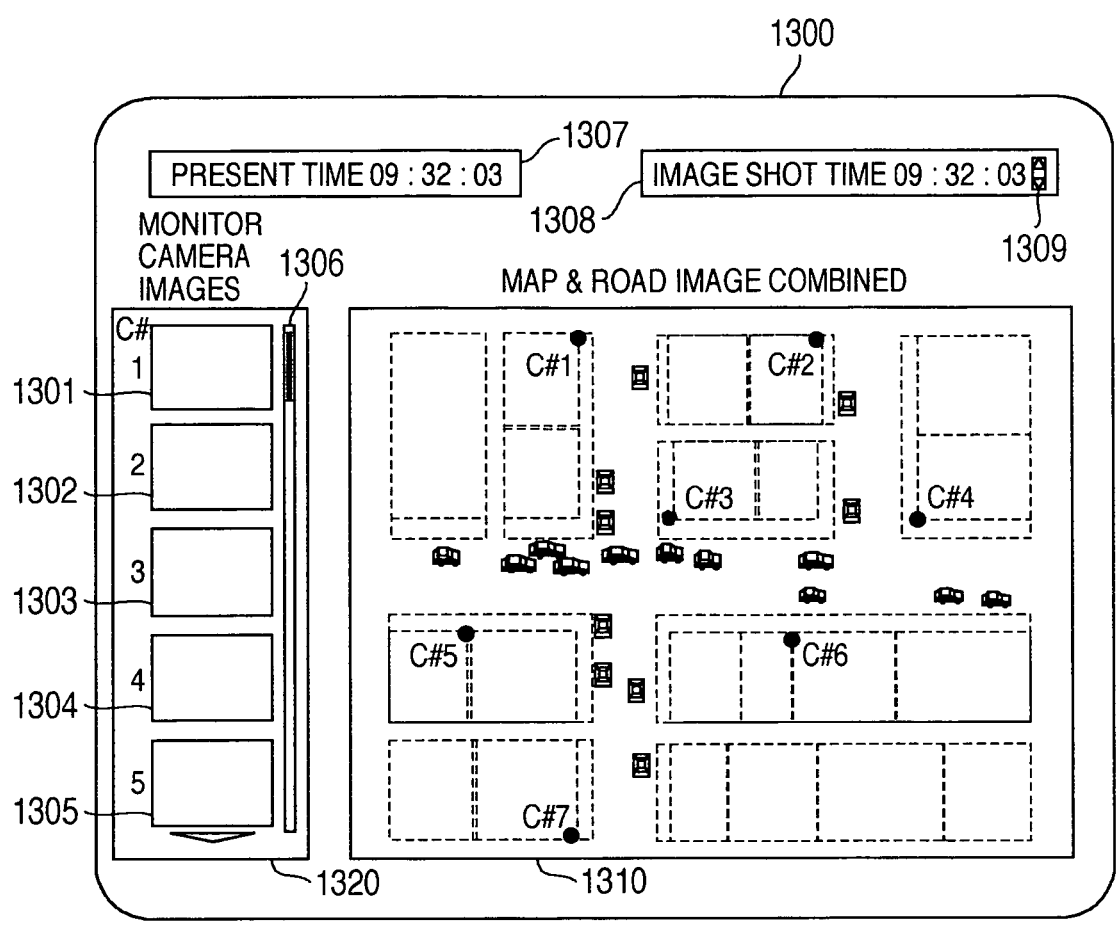
FIG. 13 is a surveillance image display screen of the surveillance system of the invention.

Next, the display processing 214 of FIG. 2 will be explained by use of FIG. 13. FIG. 13 is an exemplary on-screen display image of the display device 121 of FIG. 1. On its screen 1300, there are laid out i) a map and monitor image synthesis display window 1310 in which the above-noted image with each surveillance camera image being geometrically deformed through appropriate projection conversion on the surveillance city block map while excluding any portions that are absent on the same plane as the road ground surface is synthetically displayed at the road portions on the map while having correct geometrical compliance or consistency, ii) a surveillance camera image non-conversion display window 1320 for directly displaying a native version of each monitor camera image, iii) a present time display window 1307 for displaying a present time, and iv) an imaging time display window 1308 for displaying the imaging time point of a presently displayed monitor camera image.

The imaging time display window 1308 contains therein an imaging time change up/down button 1309 used to set a designated imaging time point for extraction from a specific time-captured image of the accumulated images 132 that have been stored in the external storage device 124 of FIG. 1 as the monitor camera images within the map/monitor synthesis display window 1310 and monitor camera image non-conversion display window 1320 other than a real-time image at the present time point being displayed.

Within the monitor camera image nonconversion display window 1320, those images of surveillance cameras with unique monitor camera numbers added thereto, which images are acquired at the time point being presently displayed in the imaging time display window 1308, are laid out in individual camera captured image display windows 1301, 1302, 1303, 1304, 1305 in such a manner that these are aligned and queued in an ascending order of the camera numbers in a top-to-bottom ranking fashion. For those monitor camera-captured images that cannot be displayed within the window 1320, a scroll bar 1306 is manually operated to increase or decrease the monitor camera number to be displayed in the uppermost camera captured image display window 1301 whereby the camera numbers of the other camera captured image display windows 1301-1305 are also modified to thereby display within the window 1320 a monitor camera-captured image having a desired camera number.

In this way, it is possible to synthesize or merge onto the map the image obtained by removal of certain portions that are absent in the same plane as the road ground surface from an image to which the projection conversion 212 suitable for a respective one of the monitor camera images was applied.

Thus the mutual relationship of respective monitor camera images is consistently matched on the map in a unified manner so that it becomes possible to visually monitor on the map a road situation within the surveillance area.

According to this embodiment, the surveillant is no longer required to read and understand surveillance camera images in accordance with the characteristics unique to such monitor cameras, such as the location and imaging direction of each camera of the system.

Embodiment 2

Figure 11:
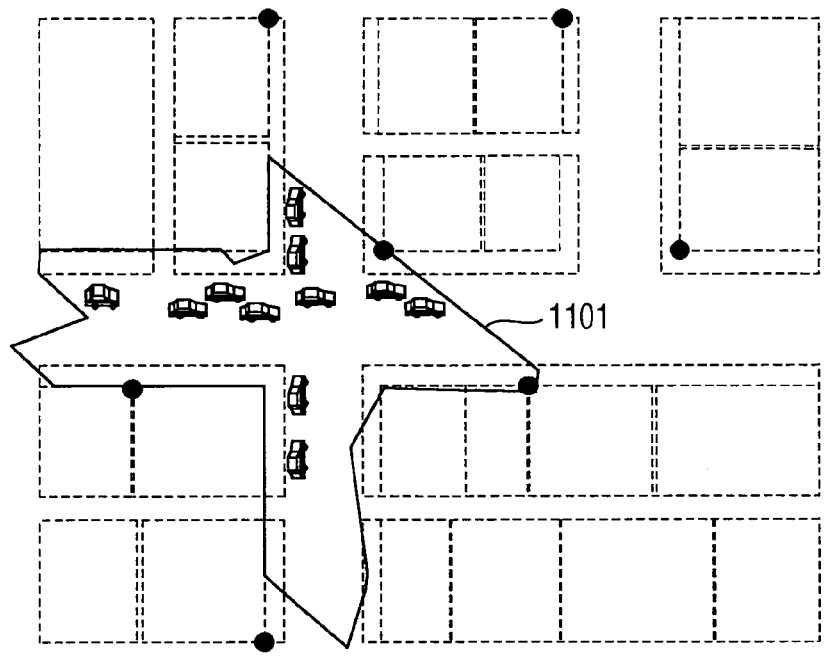
FIG. 11 is an on-the-map synthesized display of an image resulted from cropping only road part from an image that causes the geometric shapes of road portions captured by the surveillance cameras at the locations 303 and 304 to match with the map, respectively.

In the surveillance system explained in Embodiment 1, in cases where a scene image acquired by the surveillance camera 303 that is installed in the city block shown in FIG. 3 and an image captured by the monitor camera 304 are different in imaging time from each other, it is hardly expected to display the status at a given instant in the entirety of the surveillance area. For this reason, in the image with road status images of two separate cameras being synthesized together as shown in FIG. 11, the image portion of a moving object, such as for example a land vehicle, is photographed so that the same automobile was present at different road surface positions in the overlapped part of the mask information 901 and mask information 1001. This causes in some cases a problem in quality of the image synthesized, such as undesired synthesis and display thereof in a double offset manner like a ghost.

Consequently in the second embodiment, its feature lies in that the monitor cameras 101, 102, 103 in the surveillance system shown in FIG. 1 are made up of a certain type of cameras capable of establishing mutual synchronization of the frame timing during motion picture or video acquisition. For the other matters, the surveillance system is similar to Embodiment 1 in system arrangement and also in surveillance image display method for use therein. An example of the implementation of a plurality of surveillance cameras with such mutual synchronizability in video imaging operations will be explained with reference to some of the accompanying drawings below.

Figure 14:
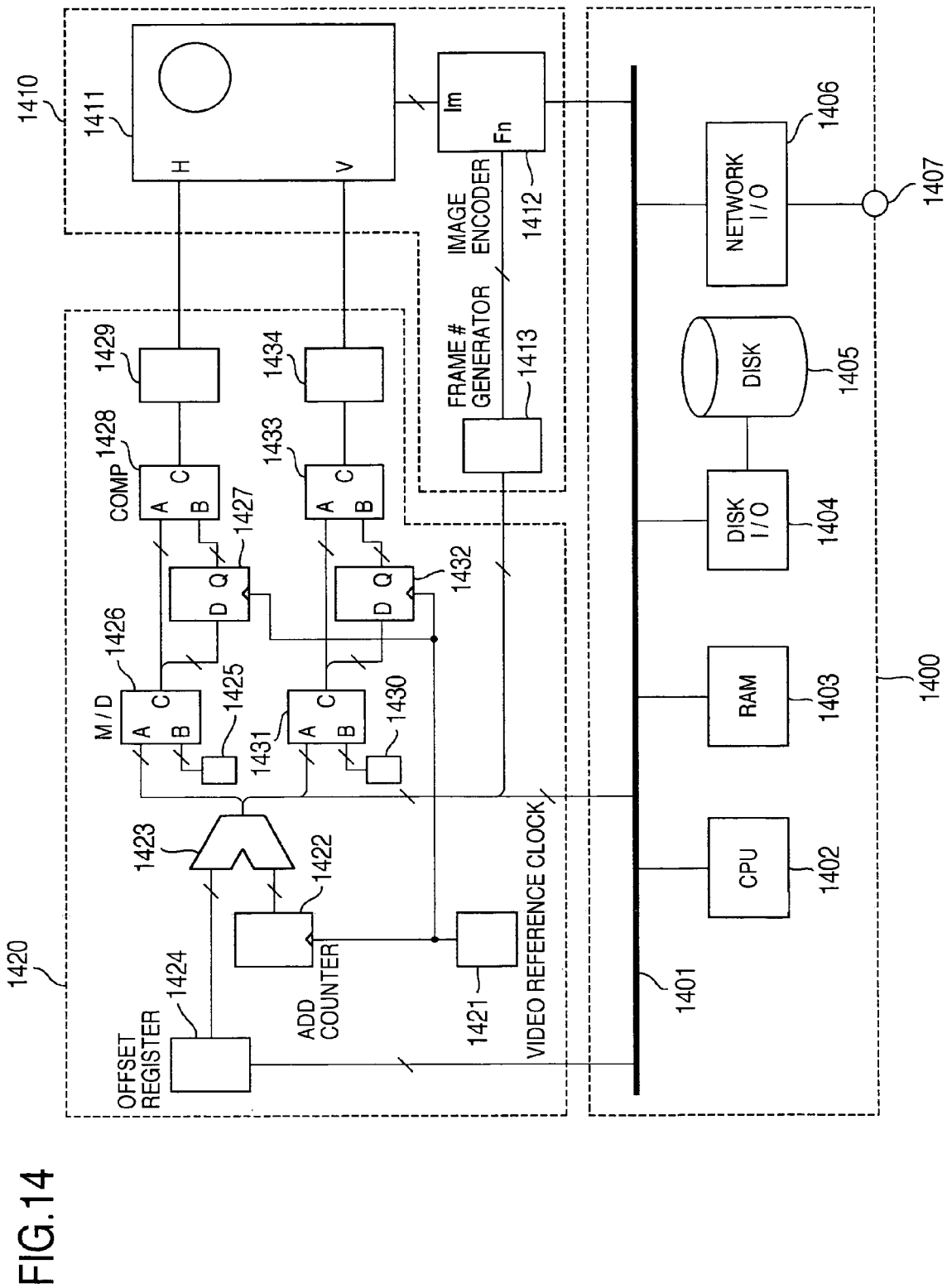
FIG. 14 is a functional block diagram of a network surveillance camera for use in a second embodiment of the invention.

FIG. 14 shows, in function block diagram form, a configuration of a network-linked surveillance camera indicating an embodiment of this invention. This network monitor camera embodying the invention is generally made up of a built-in computer block 1400, an image data generation block 1410, and a phase-controllable synchronization signal generation block 1420.

The built-in computer block 1400 includes a central processing unit (CPU) 1402, random access memory (RAM) 1403, disk control interface 1404 and network interface 1406, which are connected together via an internal bus 1401. As in currently available general-purpose computers, the computer block 1400 functions to load any given program code, which is stored in a hard disk 1405 that is connected through the disk control interface 1404, into the RAM 1403 for enabling the CPU to execute the program code. Furthermore, let the hard disk 1405 store therein an operating system (for example, Linux™ or else) which includes a software program module necessary for communicating with an external network linkable via a network link terminal 1407 and a program module capable of exchanging data between itself and any one of the image data generation block 1410 that is connected via the internal bus 1401 and the phase-controllable synchronization signal generation block 1420. Upon startup, the operating system (OS) is loaded and then rendered operative, causing a video image acquisition synchronizing program to operate under the control of the OS in a way as will be discussed below.

The image data generation block 1410 is configured from a camera module 1411 capable of controlling the imaging timing by supplying a respective one of vertical and horizontal synchronization signals, an image encoder 1412 for conversion to various kinds of industry standard image data formats with or without compression capability (e.g., JPEG), and a frame number generator 1413 operable to calculate a frame number based on counter information of the synch signal generation block 1420. A digital video signal as output from the camera module 1411 and frame number information as output from the frame number generator 1413 are taken into the image encoder 1412 for conversion to digital data with a proper image data format, which data is passed via the internal bus 1401 and then read into the built-in computer block 1400 for transmission to the external network by way of the network interface 1406.

The phase-controllable sync signal generation block 1420 includes an image reference clock generator 1421, a 32-bit accumulative counter 1422 which adds 1, once at a time, to a pulse signal generated by the block generator, an offset register 1424 capable of setting a 32-bit integer value from the built-in computer block 1400, an adder 1423 for adding together a count value of the addition counter 1422 and a setup value of the offset register 1424, a frequency division ratio 32-bit constant register 1425 for setting a ratio of a clock cycle or period of the image reference clock generator 1421 versus the period of a horizontal sync signal being supplied to the camera module 1411, a multiplication and division circuit 1426 for subtracting an output numeric value of the adder 1423 by a numeric value being presently set at the frequency division ratio constant register 1425 and for outputting a calculation result in the form of a 32-bit data signal, a register 1427 for retaining therein an output value of the multiplier/divider 1426 within a time period equivalent to one cycle of the reference clock, a comparator 1428 which receives at its input node "A" the output value of the multiplier/divider 1426 and also inputs an output value of the register 1427 at its node "B" for outputting a 1-bit data signal of logic "1" when A is less than B and for outputting a "0" in the other events, a monostable multivibrator 1429 for generating a horizontal sync signal pulse waveform from an output pulse of the comparator 1428, a frequency division ratio 32-bit constant register 1430 for setup of a ratio between the periods of a clock signal of the image reference clock generator 1421 and a vertical sync signal being supplied to the camera module 1411, a multiplier/divider 1431 for subtracting an output numeric value of the adder 1423 by a numeric value being set at the frequency division ratio constant register 1430 and for outputting its calculation result in the 32-bit data form, a register 1432 for holding an output value of the multiplier/divider 1431 within a time period equivalent to one cycle of the reference clock, a comparator 1433 which receives at its input node A an output value of the multiplier/divider 1431 and also inputs an output value of the register 1432 at its node B for outputting a 1-bit signal of logic "1" when A is less than B and for outputting a "0" in the other cases, and a monostable multivibrator 1434 for generating a horizontal sync signal pulse waveform from an output pulse of the comparator 1433.

In the second embodiment, a use form of the network surveillance camera with image acquisition synchronization functionality is as follows. It is used by replacing each of the network surveillance cameras 101, 102, 103 in the surveillance system configuration diagram of FIG. 1 of the first embodiment with the imaging-synchronization function-added network surveillance camera having its internal configuration shown in FIG. 14.

An operation of the imaging synchronization function-added network surveillance camera has two types of operation modes as set therein. One is a synchronization dependence or "slave" mode; the other is a synchronization reference mode. In the system configuration of FIG. 1, only one of all the network cameras linked to the network 104—for example, a surveillance camera 101—is designed to operate in the sync reference mode while letting any one of the remaining surveillance cameras 102, 103 operate in the sync slave mode.

The operation of the network surveillance camera of the invention will be explained using flow charts of FIGS. 15 and 16 in relation to its sync reference mode and sync slave mode, respectively.

Figure 15:
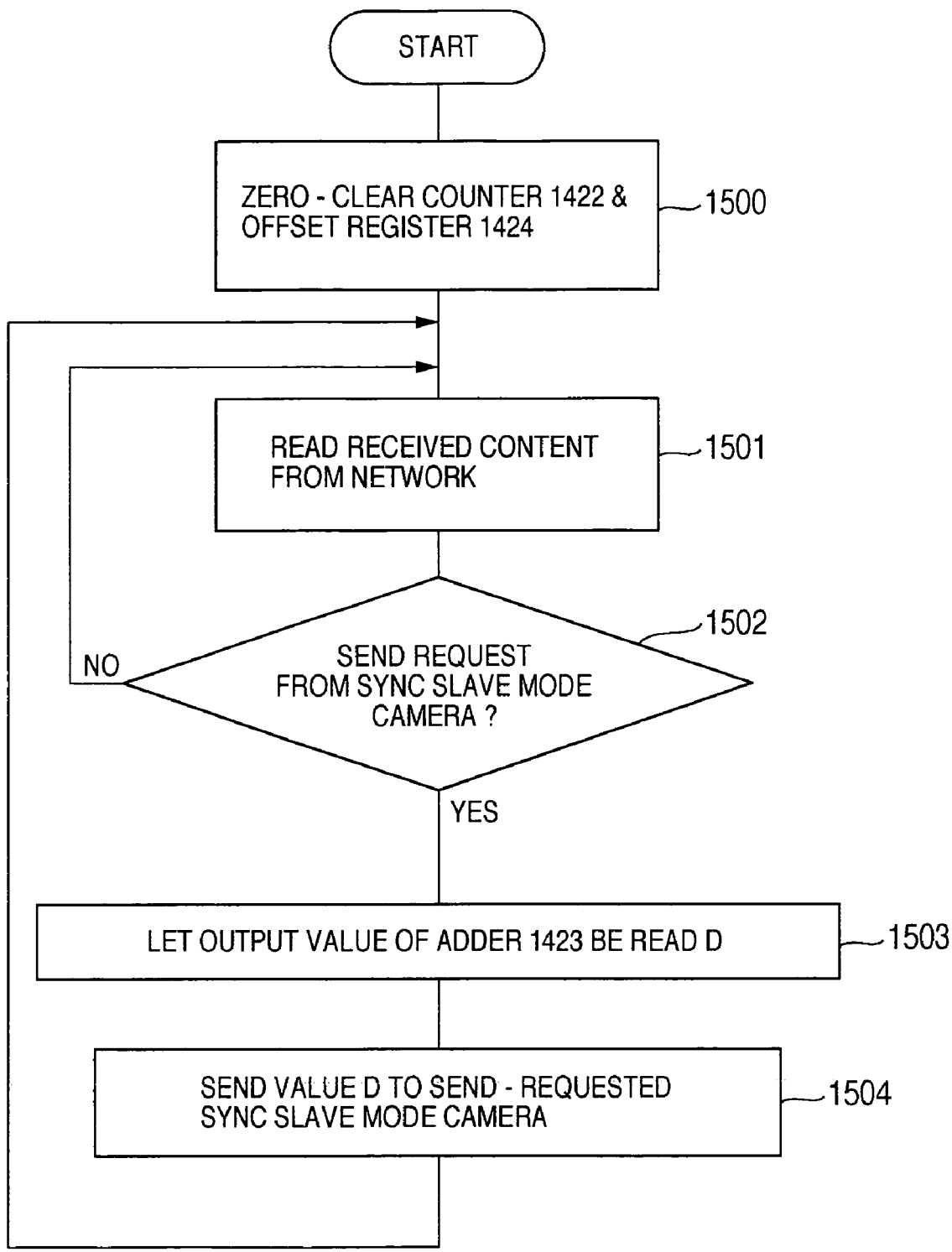
FIG. 15 is a flow chart for explanation of an operation of the network surveillance camera of the invention in a synchronous reference mode.

In the sync reference mode, let the built-in computer block 1400 execute an appropriate program in accordance with the flow chart of FIG. 15. Firstly, at a procedure step 1500, perform the zero-clearing or resetting of the addition counter 1422 and the offset register 1424 of the phase-controllable sync signal generation block 1420. From immediately after this step, the addition counter 1422 is operable to increase its counter value by one at a time with the interval of pulses to be generated by the image reference clock generator 1421.

At step 1501, read the content of data received from the network, to which the built-in computer block 1400 is linked. Then at step 1502, determine whether the reception content thus read is a send request from a network camera that is operating in the sync slave mode. If not the send request, then return to the step 1501. If the received content is the send request then go to step 1503, which reads an output value of the adder 1423 of the phase-controllable synch signal generation block 1420. In the sync reference mode the value of the offset register 1424 is kept unrevised after the reset and thus stays at zero so that the output value of the adder 1423 is identical to the count value of addition counter 1422. Then at step 1504, rapidly transmit the read counter value of addition counter 1422 toward the sync slave mode-operating network camera that has issued the send request. Subsequently, return again to step 1501, for sequentially continuing to send back the count value of addition counter 1422 in replay to a send request(s).

Figure 16:
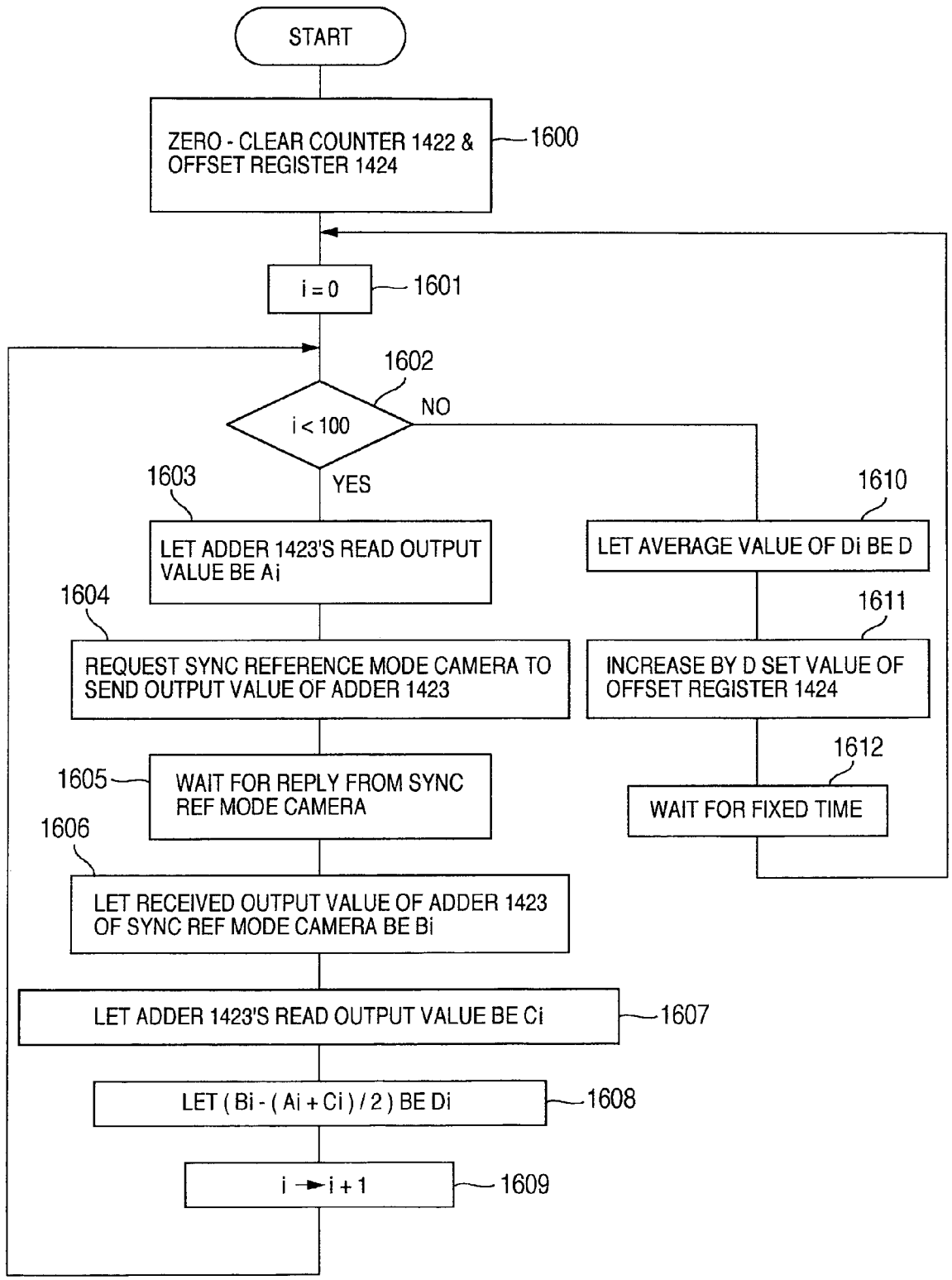
FIG. 16 is a flowchart for explanation of an operation of the network surveillance camera of the invention in a sync slave mode.

In the sync slave mode, let the built-in computer block 1400 execute a program in accordance with the flowchart of FIG. 16. First, at step 1600, clear to zero the addition counter 1422 and the offset register 1424 of the phase-controllable sync signal generation block 1420. From immediately after this step, the addition counter 1422 operates to increase its counter value by one at a time at intervals of pulses generated by the image reference clock generator 1421. At step 1601, substitute zero to a parameter "i" for control of the repeat number of a loop covering from step 1603 up to step 1609. At a conditional branch of step 1602, if the parameter i is less than 100 then pass the control to execution of task part of the following steps 1603 to 1609; if the parameter i is greater than or equal to 100 then jump to step 1610. At the first step 1603 of the repeat loop calculation block consisting of a series of steps 1603 to 1609, the output value of adder 1423 is assumed to be read data "Ai."

At step 1604, send via the network a request packet for requesting a camera that is operating in the sync reference mode to transmit an output value of the adder 1423 of the camera. At step 1605, wait for reception of the information that was requested at step 1604. If such reception is available then proceed to the next step 1606. At step 1606, let the output value of adder 1423 of the sync reference mode camera which is the received information be "Bi." Then at step 1607, let an output value of the adder 1423 of the self camera be read data "Ci." At step 1608, calculate (Bi−(Ai+Ci)/2) to obtain a result, which is given as Di. At step 1609, increase by 1 the value of i of the repeat number control parameter; then, return to step 1602. After repeated execution of the series of steps 1603 to 1609 for hundred times, the system procedure proceeds to step 1610. At step 1610, use a hundred of data bits Di that have been calculated at step 1608 to thereby obtain an average value thereof—here, let it be D. At step 1611, set a value resulted from the addition of the numeric value D to a presently set value of the offset register 1424. Whereby, it is expected that the output value of adder 1423 is modified so that this value is identical, exactly at this time, to the output value of the adder 1423 of the sync reference mode camera.

At step 1612, wait for the elapse of a predetermined length of time in order to execute again the above-noted modification procedure with a blank of the predetermined time. Thereafter, return the control to the step 1601. The fixed length of the wait time is determinable from a clock chop interval difference among the cameras occurring due to an individual difference of the image sync reference clock 1421 and/or a wobble amount of the clock chop interval of each image sync reference clock 1421. Further, in order to suppress any unwanted increase in network traffic, it is recommendable to restrain from performing communications for the synchronization purpose at excessively increased frequent intervals. By taking account of these conditions, the wait time of step 1612 is set to range from several tens of seconds to several tens of minutes.

Figure 17:
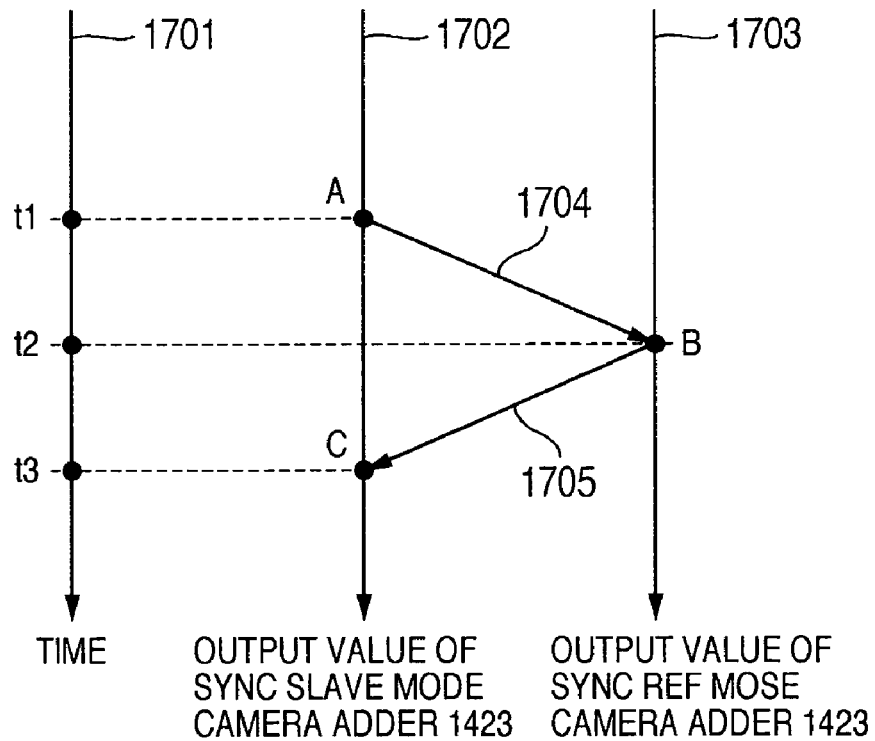
FIG. 17 is an explanation diagram of the communication timing and communication contents between the camera operable in the synch reference mode and the camera operable in the sync slave mode.

Using FIG. 17, an explanation will now be given of the principle of an event that the operation of sync slave mode camera as has been explained in the flowchart of FIG. 16 results in the output value of adder 1423 of the self camera being synchronized with the output value of adder 1423 of a sync reference mode camera. In FIG. 17, there are shown side-by-side along a coordinate axis 1701 indicative of time points an axis 1702 which indicates a change in output value of the adder 1423 of the camera operating in the sync slave mode and an axis 1703 indicating a change in output value of the adder 1423 of the camera operating in the sync reference mode. Suppose that at a time point t1 on the time axis 1701, a request is issued for sending the output value of adder 1423 of the sync reference mode camera from the sync slave mode camera to sync reference mode camera at the step 1604 of the flowchart of FIG. 16. The output value of adder 1423 of the sync slave mode camera at this time point t1 is given by "A." When this send request arrives at the sync reference mode camera at a time point t2, this sync reference mode camera promptly sends back the output value "B" of the adder 1423 toward the sync reference mode camera. This reply reaches the sync slave mode camera at a time point t3. Assume that an output value of the adder 1423 of the sync slave mode camera at such the instant is "C." At this time, it is assumable that a time (t2−t1) taken for send request communication 1704 of from the sync slave mode camera to the sync reference mode camera is equal in length to a time (t3−t2) taken for the reply 1705 from the sync reference mode camera to sync slave mode camera. Thus, the output value of adder 1423 of the sync slave mode camera at the time point t2 is presumed as (A+C)/2. Accordingly, the value (B−(A+C)/2) is considered to be a difference at this time point between the output value of adder 1423 of the sync slave mode camera and the output value of adder 1423 of the sync reference mode camera. It must be noted here that such the presumption as to the equity of (t2−t1) and (t3−t2) is not always established because of the presence of influence of communication environments. In view of this fact, another presumption is further introduced, saying that the difference between the values (t2−t1) and (t3−t2) occurring due to the influence of communication environments takes place due to probabilistic factors. Based on such presumption, the difference between the output values of adders 1423 of two separate cameras at the same time point is calculated again and again for hundred times to thereby obtain the average value thereof, which is then used as a good estimate value of the difference between the output values of the adders 1423. By adding such the difference between the output values of adders 1423 thus estimated in this way to a presently set value of the offset register 1424 of the sync slave mode camera, the output value of adder 1423 is expected to increase by (B−(A+C)/2), resulting in coincidence with the output value of the adder 1423 of the sync reference mode camera at the same time point. As apparent from the foregoing, the output value of an adder 1423 of every network-linked camera operable in the sync slave mode is identical during operation to the output value of the adder 1423 of the only camera operable in the sync reference mode.

Figure 18:
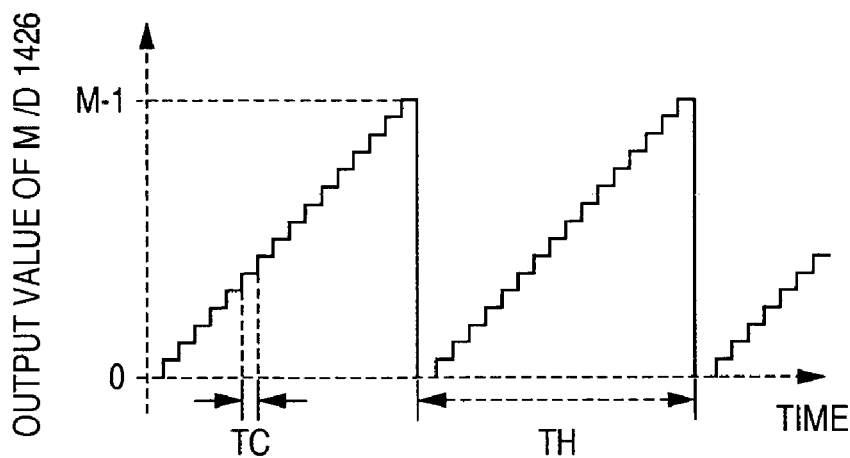
FIG. 18 is a graph showing a change with time of an output value of a multiplication and division unit 1426.

The image reference clock 1421 of every camera is set equal in frequency to the others. The output value of the adder 1423 of every camera is such that its value increases one by one at the same time intervals. Letting the time interval for a change of this output value be TC, the integer ratio of a sync pulse pitch of the horizontal sync signal being input to the camera module 1411 with respect to the time TC is represented by "M." This value M is preset to the frequency division ratio constant register 1425. Doing so may cause an output value of the multiplier/divider 1426 to repeat increment and decrement at time intervals TH as shown in FIG. 18. With the use of this characteristic feature, the timing of a decrement of the multiplication/division value is detectable by allowing the comparator 1428 to compare an output value of the register 1427 that holds the output value of the multiplier/divider 1426 prior to the reference clock's one cycle time TC to the output value of multiplier/divider 1426, thereby obtaining pulses of the period TH. The pulses with this period TH are reshaped by using the monostable multivibrator into the waveform of horizontal sync signal, which is then supplied as the horizontal sync signal of the camera module 1411.

Similarly, an integer ratio of a sync pulse pitch TV of the vertical sync signal being input to the camera module 1411 versus the one cycle time TC of the image reference clock 1421 is given as "N." This value N is preset to the frequency division ratio constant register 1430. In this case, as in the case of the horizontal sync signal generation stated supra, pulses of the period TV are obtainable as an output of the comparator 1433. The pulses with this period TV are reshaped by the monostable multivibrator 1434 into the waveform of vertical sync signal, which is then supplied as the horizontal sync signal of the camera module 1411.

As previously stated, the output value of the adder 1423 of every network-linked camera operable in the sync slave mode is identical during operation to the output value of the adder 1423 of the only camera operable in the sync reference mode, whereby the horizontal sync signal and vertical sync signal which are generated at every camera in the above-stated way become sync signals that are exactly in phase with each other. Accordingly, the acquisition timing of an image to be captured by the camera module 1411 becomes synchronized among the cameras involved. Further, as the frame number generator 1413 is arranged to calculate a frame number based on the output value of the adder 1423 having the same value among the cameras, the frame number is also capable of generating the same value while offering synchronizability among the cameras. A frame number calculation method is arranged to calculate as the frame number FN a maximal integer value that does not exceed a value of (A/f/TV), where "A" is the output value of adder 1423, f is the clock frequency of the sync reference clock 1421, and TV is the period of the vertical sync signal. As for the video data synchronously acquired by the camera module 1411, the image encoder 1412 converts it into a specific image data format while burying into each image data the frame number being well synchronized among the cameras. The imaging timing-synchronized video data thus generated in this way will be transferred via the network 104 to the video collect/browse server 120.

In the surveillance system arranged to use the imaging-synchronizable surveillance cameras with its remaining components being similar to those of the first embodiment, image degradation and deterioration will no longer take place, such as doubly shifted or "ghosted" synthetic display of the same land vehicle at a composite image portion of certain part of the scene image 1101 indicative of the road states of multiple surveillance cameras as buried in a map image such as shown in FIG. 11, which image portion is being repetitively acquired by a plurality of cameras.

According to this embodiment, it becomes possible to synthesize for on-screen display several surveillance camera images in a map image while achieving higher quality than the first embodiment. This in turn advantageously makes it possible to obviate occurrence of the surveillant's situation judging mistakes otherwise occurring due to the inaccuracy of merged images, in addition to similar effects to those of the first embodiment.

According to the embodiments explained previously, it becomes possible to display, on a map in a centralized way, a plurality of surveillance camera-captured video images different from one another in imaging direction and imaging position plus imaging view angle while unitarily compensating differences in on-screen visual appearance among the plurality of monitor camera images. Thus it is no longer required to individually perform, in units of different monitor camera images, the reading and understanding of multiple monitor camera images in surveillance areas. This in turn makes it possible to readily recognize within the map the mutual relationship of imaging ranges of different monitor camera-captured videos, which leads to achievement of an effect that the security officer's workload can be lightened.

The conceptual principles of the present invention may be utilizable to surveillance or "watchdog" systems for traffic monitoring or for monitoring a wide range of area, such as shopping malls, public spaces, entire floors of buildings or equivalents thereto.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image generation apparatus connected to a plurality of imaging devices for acquiring images from different directions, said apparatus comprising:
   a unit receiving from said imaging devices image data indicative of respective images as taken thereby;
   an extraction unit extracting a specified region in units of said image data; and
   a synthesis unit combining said extracted image data with map information containing an imaging area of said imaging devices to thereby generate an image,
   wherein at least one of said plurality of imaging devices has a synchronous reference counter, for sending and receiving, between said plurality of imaging devices, synchronization information concerning a synchronization signal for use as a reference of imaging timing, for adjusting based on said synchronization information a readout value of said synchronous reference counter, for generating a synchronization signal based on the readout value of said synchronous reference counter, and for controlling the at least one of said plurality of imaging devices based on said synchronization signal.

2. The image generation apparatus according to claim 1, further comprising:
a unit retaining the map information containing the imaging area; and
a conversion unit converting a geometric shape of said image based on said map information, wherein
said extraction unit extracts a specified region of said image data thus converted.

3. The image generation apparatus according to claim 2, wherein said conversion unit performs conversion for causing the specified region extracted at said extraction unit to be identical in geometric relationship to said map information.

4. The image generation apparatus according to claim 3, wherein said conversion unit performs conversion per imaging device based on a parameter indicative of correlation between a first position coordinate included in said specified region of the image to be taken and a position coordinate of said map information corresponding to said first position coordinate.

5. The image generation apparatus according to claim 2, wherein said extraction unit extracts from said image data converted by said conversion unit a region in which said image data and said map information are identical in geometric relationship to each other.

6. The image generation apparatus according to claim 5, wherein the apparatus retains in advance mask information per imaging device for indicating a region in which the image data converted by said conversion unit is identical in geometric relationship to said map information, and wherein said extraction unit extracts, based said mask information per said imaging device, a specified region from said image as taken by each said imaging device.

7. The image generation apparatus according to claim 2, further comprising:
a display unit displaying on a display screen the image synthesized by said synthesis unit.

8. The image generation apparatus according to claim 1, wherein:
the at least one of said plurality of imaging devices has a frame number generator for uniquely calculating a frame number from the readout value of said synchronous reference counter, the frame number generated by said frame number generator being buried in units of acquired images, and
said image generation apparatus synthesizes, based on the frame number buried in an image to be received from each said image device, an image with its frame number being identical thereto and said map information.

9. An image display apparatus being connected to a plurality of imaging devices for taking images from different directions and having a display unit for displaying map information containing an imaging area of more than one of said imaging devices, said apparatus comprising:
a conversion unit converting an image acquired by each said imaging device in such a way that a portion of the image is identical in geometric relationship to a partial region of said map information, wherein:
said display unit displays an image of a region out of the image converted by said conversion unit which is identical in geometric relationship to said map information in a display region for displaying said map information in accordance with said geometric relationship, and
at least one of said plurality of imaging devices has a synchronous reference counter, for sending and receiving, between said plurality of imaging devices, synchronization information concerning a synchronization signal for use as a reference of imaging timing, for adjusting based on said synchronization information a readout value of said synchronous reference counter, for generating a synchronization signal based on the readout value of said synchronous reference counter, and for controlling the at least one of said plurality of imaging devices based on said synchronization signal.

10. The image display apparatus according to claim 9, wherein:
the at least one of said plurality of imaging devices has a frame number generator for uniquely calculating a frame number from the readout value of said synchronous reference counter, the frame number generated by said frame number generator being buried in units of acquired images, and
said image display apparatus synthesizes, based on the frame number buried in an image to be received from each said image device, an image with its frame number being identical thereto and said map information.

11. An image synthesis method for combining together images to be taken by a plurality of imaging devices, said method comprising the steps of:
retaining map information containing an imaging area;
acquiring said images;
converting each image based on a parameter correlated per imaging device in such a manner that a partial region of said image is identical in geometric shape to a specified region of said map information;
extracting from the converted image an image of a region which is identical in geometric shape to the specified region of said map information; and
combining together the extracted image and said map information,
wherein at least one of said plurality of imaging devices has a synchronous reference counter, for sending and receiving, between said plurality of imaging devices, synchronization information concerning a synchronization signal for use as a reference of imaging timing, for adjusting based on said synchronization information a readout value of said synchronous reference counter, for generating a synchronization signal based on the readout value of said synchronous reference counter, and for controlling the at least one of said plurality of imaging devices based on said synchronization signal.

12. The image synthesis method according to claim 11, wherein:
the at least one of said plurality of imaging devices has a frame number generator for uniquely calculating a frame number from the readout value of said synchronous reference counter, the frame number generated by said frame number generator being buried in units of acquired images, and
said image synthesis method has a step of synthesizing, based on the frame number buried in an image to be received from each said imaging device, an image with its frame number being identical thereto and said map information.

13. An image generation system having a plurality of camera devices and an image generation apparatus connected to respective ones of said camera devices via a network, wherein:

each said camera device has an imaging unit for image acquisition and a unit for sending the image thus acquired to said image generation apparatus, and said image generation apparatus comprises:
- a storage unit retaining in advance map information containing an imaging area;
- a unit receiving said image;
- a unit converting said image based on a parameter correlated per said camera device in such a manner that a partial region of said image is identical in geometric shape to a specified region of said map information;
- an extraction unit extracting from the converted image an image of a region identical in geometric shape to the specified region of said map information;
- a unit synthesizing the extracted image and said map information to thereby generate an image; and
- a display unit displaying the synthesized image, and at least one of said plurality of camera devices has a synchronous reference counter, for sending and receiving, between said plurality of camera devices, synchronization information concerning a synchronization signal for use as a reference of imaging timing, for adjusting based on said synchronization information a readout value of said synchronous reference counter, for generating a synchronization signal based on the readout value of said synchronous reference counter, and for controlling the at least one of said plurality of camera devices based on said synchronization signal.

14. The image generation system according to claim 13, wherein:

the at least one of said plurality of camera devices has a frame number generator for uniquely calculating a frame number from the readout value of said synchronous reference counter, the frame number generated by said frame number generator being buried in units of acquired images, and said image generation apparatus synthesizes, based on the frame number buried in an image to be received from each said camera device, an image with its frame number being identical thereto and said map information.

* * * * *